United States Patent
Kim et al.

(10) Patent No.: US 12,513,136 B2
(45) Date of Patent: Dec. 30, 2025

(54) MICROSERVICE ARCHITECTURE (MSA) BASED AUTHENTICATION DEVICE AND METHOD FOR PROCESSING AUTHENTICATION THEREOF

(71) Applicants: Hyundai Motor Company, Seoul (KR); Kia Corporation, Seoul (KR)

(72) Inventors: Yun Jae Kim, Seongnam-Si (KR); Seok Won Kim, Hwaseong-Si (KR); Chan Mo Lim, Goyang-Si (KR); Jung Min Ryu, Hwaseong-Si (KR)

(*) Notice: Subject to any disclaimer, the term of this patent is extended or adjusted under 35 U.S.C. 154(b) by 230 days.

(21) Appl. No.: 18/243,149

(22) Filed: Sep. 7, 2023

(65) Prior Publication Data

US 2024/0356910 A1 Oct. 24, 2024

(30) Foreign Application Priority Data

Apr. 18, 2023 (KR) .................. 10-2023-0050826

(51) Int. Cl.
*H04L 9/40* (2022.01)

(52) U.S. Cl.
CPC ........ *H04L 63/083* (2013.01); *H04L 63/0428* (2013.01); *H04L 63/0884* (2013.01)

(58) Field of Classification Search
CPC .............. H04L 63/083; H04L 63/0428; H04L 63/0884
USPC .......................................................... 726/6
See application file for complete search history.

(56) References Cited

U.S. PATENT DOCUMENTS

| | | | |
|---|---|---|---|
| 10,338,964 B1* | 7/2019 | Kancharla | G06F 9/5083 |
| 10,412,075 B2 | 9/2019 | Matsugashita | |
| 10,911,234 B2 | 2/2021 | Jain et al. | |
| 11,082,225 B2 | 8/2021 | Kobayashi | |
| 2013/0208893 A1* | 8/2013 | Shablygin | H04L 9/0894 380/277 |
| 2015/0288694 A1* | 10/2015 | Liebl, III | H04L 9/3247 713/182 |
| 2018/0285882 A1* | 10/2018 | Jayaram | G06Q 20/023 |
| 2019/0306157 A1* | 10/2019 | Lores | H04L 63/126 |
| 2020/0259652 A1* | 8/2020 | Schmaltz, III | H04L 9/30 |
| 2021/0133008 A1* | 5/2021 | Rodean | H04L 67/306 |
| 2021/0203507 A1* | 7/2021 | Rule | H04L 63/0853 |
| 2022/0030435 A1* | 1/2022 | Rule | H04W 12/068 |
| 2023/0086577 A1* | 3/2023 | Saravanan | H04L 69/22 726/1 |
| 2023/0208830 A1* | 6/2023 | Liu | H04L 63/0807 726/7 |

FOREIGN PATENT DOCUMENTS

KR 102049527 B1 11/2019

* cited by examiner

*Primary Examiner* — Dant B Shaifer Harriman
(74) *Attorney, Agent, or Firm* — Banner & Witcoff, Ltd.

(57) ABSTRACT

An authentication device based on microservice architecture (MSA) is disclosed. An example device includes a communication interface, storage, and a processor configured to process authentication requests. Upon receiving an authentication request from a client device, the processor determines the target of the request, and communicates with a service corresponding to the target to obtain an encrypted payload. The processor assigns an identifier to the service, stores the encrypted payload along with the identifier, and generates an authentication token based on the identifier. The token is then sent to the client device.

20 Claims, 9 Drawing Sheets

MICROSERVICE ARCHITECTURE (MSA) BASED AUTHENTICATION DEVICE AND METHOD FOR PROCESSING AUTHENTICATION THEREOF

CROSS-REFERENCE TO RELATED APPLICATION

This application claims the benefit of priority to Korean Patent Application No. 10-2023-0050826, filed in the Korean Intellectual Property Office on Apr. 18, 2023, the entire content of which is incorporated herein by reference.

TECHNICAL FIELD

The present disclosure relates to a microservice architecture (MSA)-based authentication device and an authentication processing method thereof, and more particularly, relates to technologies of processing authentication in an MSA-based control system.

BACKGROUND

A microservice architecture (MSA) is to be applied to a large-scale system, which refers to an architecture that decomposes and serves a function into small units (or modules) which may be separately executed and may be independently arranged. When a robot is controlled based on the MSA, a token authentication scheme using a web token (e.g., a JavaScript Object Notation (JSON) web token (JWT)) may be used to perform authentication of a robot or a user.

However, in the token authentication scheme, the larger the payload included in a token is, the more the transmitted traffic may increase and the more the network load may increase. In addition, because the payload is directly delivered to a client, the token authentication scheme may be vulnerable to security. Furthermore, when microservices of the MSA directly identify payload data and when corrections occur in token authentication, there may be a need for maintenance of the performance of all microservices.

SUMMARY

The present disclosure has been made to solve the above-mentioned problems occurring in the prior art while advantages achieved by the prior art are maintained intact.

An aspect of the present disclosure provides an MSA-based authentication device for preventing a network load from increasing, enhancing security, and facilitating maintenance of a microservice and an authentication processing method thereof.

Another aspect of the present disclosure provides an MSA-based authentication device for processing authentication processes for a user or a robot in MSA-based microservices in an integrated manner and an authentication processing method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an authentication device comprising: a communication device; data storage; one or more processors; and memory. The memory may store instructions that, when executed by the one or more processors, configure a microservice architecture (MSA) of the authentication device to: receive an authentication request from a client device; determine, based on the authentication request, an authentication request target; request, via the communication device, an encrypted payload from a first service, among a plurality of services of the MSA, that corresponds to the authentication request target; determine an identifier corresponding to the first service; store, in the data storage, the identifier and the encrypted payload; generate, based on the identifier, an authentication token; and send the authentication token to the client device.

The authentication token may include information associated with the identifier.

The authentication token may not include the encrypted payload.

The instructions, when executed by the one or more processors, may further configure the MSA of the authentication device to: determine a key corresponding to the identifier; determine a value corresponding to the encrypted payload; and generate a key-value pair comprising the key and the value. The instructions, when executed by the one or more processors, may configure the MSA of the authentication device to store the identifier and the encrypted payload by storing, in the data storage, the key-value pair.

The authentication token may include a JavaScript Object Notation (JSON) web token (JWT).

The identifier may include a universal unique identifier (UUID).

The instructions, when executed by the one or more processors, may further configure the MSA of the authentication device to: receive, from the client device, a data request comprising the authentication token; determine the identifier corresponding to the authentication token included in the data request; obtain the encrypted payload corresponding to the identifier; determine, based on the encrypted payload corresponding to the identifier, a data access right; and send an indication of authentication failure to the client device, wherein the authentication failure is based on the data access right.

The instructions, when executed by the one or more processors, may configure the MSA of the authentication device to determine the data access right by: sending, to the first service, the encrypted payload; and obtaining, from the first service, information indicating, based on the encrypted payload, whether to allow data access.

The MSA may include a gateway device. The instructions, when executed by the one or more processors, may configure the MSA of the authentication device to send the encrypted payload and obtain the information via the gateway device.

The instructions, when executed by the one or more processors, may configure the MSA of the authentication device to determine the identifier corresponding to the authentication token by: verifying a signature of the authentication token included in the data request, and determining the identifier corresponding to the authentication token based on the verification.

According to one or more example embodiments of the present disclosure, a method may include: receiving, by a computing device that comprises a microservice architecture (MSA), an authentication request from a client device; determining, based on the authentication request, an authentication request target; requesting an encrypted payload from a first service, among a plurality of services of the MSA, that corresponds to the authentication request target; determining an identifier corresponding to the first service; storing, based on the identifier, the identifier and the encrypted payload; and generating, based on the identifier, an authentication token; and sending the authentication token to the client device.

The authentication token may include information associated with the identifier.

The authentication token may not include the encrypted payload.

Storing may include: determining a key corresponding to the identifier; determining a value corresponding to the encrypted payload; generating a key-value pair comprising the key and the value; and storing the key-value pair.

The authentication token may include a JavaScript Object Notation (JSON) web token (JWT).

The identifier may include a universal unique identifier (UUID).

The method may further include: receiving, from the client device, a data request comprising the authentication token; determining the identifier corresponding to the authentication token included in the data request; obtaining the encrypted payload corresponding to the identifier; determining, based on the encrypted payload corresponding to the identifier, a data access right; and sending an indication of authentication failure to the client device, wherein the authentication failure is based on the data access right.

Determining the data access right may include: sending, to the first service, the encrypted payload; and obtaining, from the first service, information indicating, based on the encrypted payload, whether to allow data access.

The MSA may include a gateway device. Sending the encrypted payload may include sending the encrypted payload via the gateway device. Obtaining the information may include obtaining the information via the gateway device.

Determining the identifier corresponding to the authentication token may include: verifying a signature of the authentication token included in the data request; and determining the identifier corresponding to the authentication token based on the verification.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, one or more example embodiments of the present disclosure will be described in detail with reference to the accompanying drawings. In adding the reference numerals to the components of each drawing, it should be noted that the identical component is designated by the identical numerals even when they are displayed on other drawings. Further, in describing one or more example embodiments of the present disclosure, a detailed description of well-known features or functions will be ruled out in order not to unnecessarily obscure the gist of the present disclosure.

In describing the components of one or more example embodiments of the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, one or more example embodiments of the present disclosure will be described in detail with reference to FIGS. 1 to 9.

Figure 1:
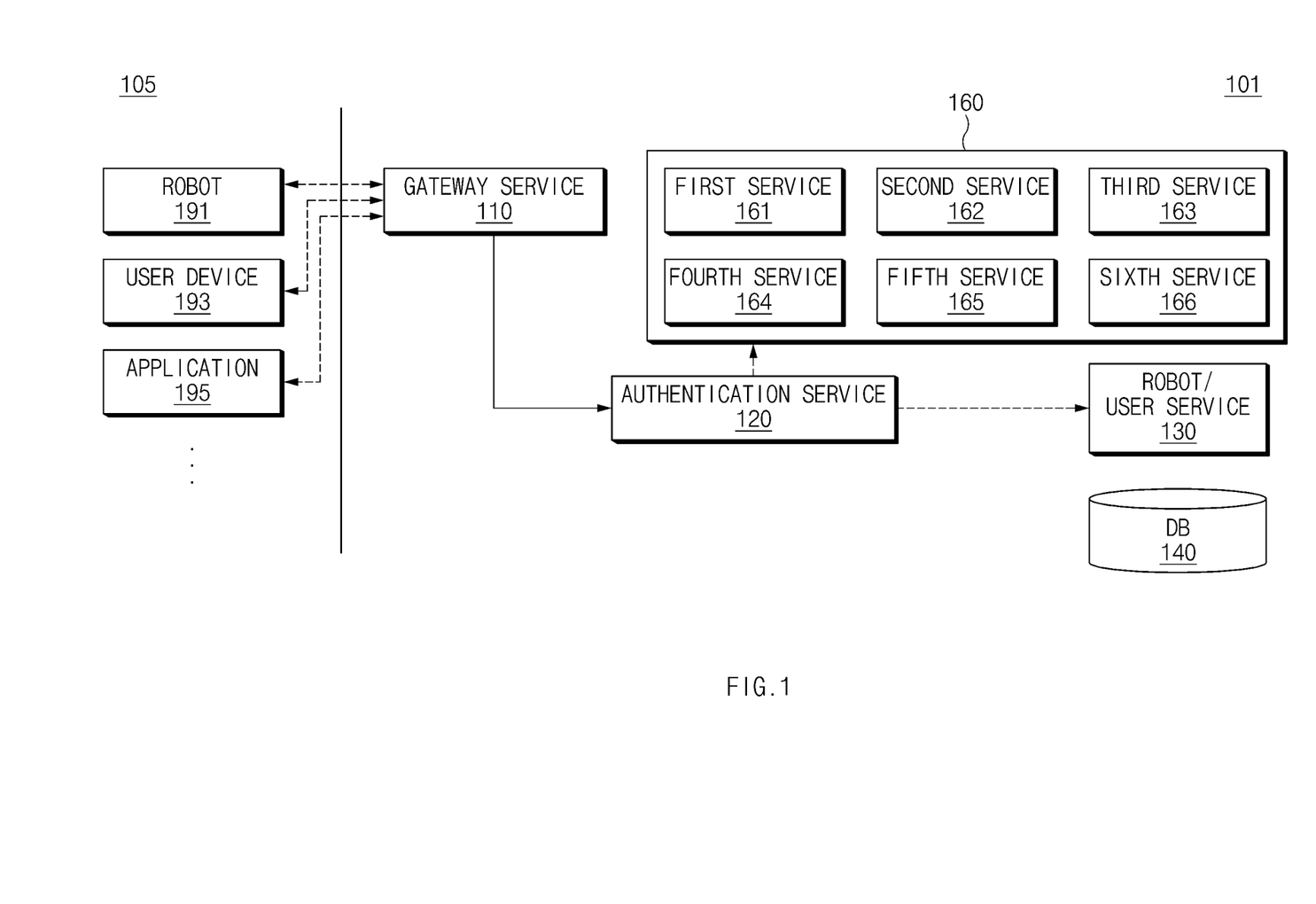
FIG. 1 is a block diagram illustrating an MSA-based control system.

FIG. 1 is a block diagram illustrating a microservice architecture (MSA)-based control system.

Referring to FIG. 1, an MSA-based control system 101 may include a gateway service 110, an authentication service 120, a robot/user service 130, a plurality of services 160, and a database (DB) 140. Each of the services 160 of the control system 101 may be implemented as a server device. Each of the services 160 of the control system 101 may be implemented as a hardware device and/or a software module.

The control system 101 may transmit and receive data with a device (e.g., a robot 191, a user device 193, or an application 195) in the outside 105. The control system 101 may, for example, monitor, manage, and/or control the robot 191 as a system for controlling the robot 191. For example, the user device 193 may include a client device and/or a manager device associated with the robot 191, and the application 195 may include an application associated with the robot 191.

The gateway service 110 may deliver a request, received from the outside 105 of the control system 101, to a service corresponding to the request. For example, the gateway service 110 may unify end-points of all the services 160 of the control system 101. For example, the gateway service 110 may serve to route a request (e.g., an application programming interface (API) call) from the outside 105 to each service. The gateway service 110 may deliver information associated with the device in the outside 105 to the service corresponding to the request depending on an authentication request received from the device in the outside 105. The gateway service 110 may deliver an authentication token to the authentication service 120 depending on a data request received from the device in the outside 105. The gateway service 110 may deliver an API request to a service corresponding to the data request. The gateway service 110 may deliver a response (e.g., an authentication token or an API response) of the control system 101 to the device in the outside 105.

The authentication service 120 may process authentication for the request received from the device in the outside 105 of the control system 101. The authentication service 120 may process authentication for all the services 160 included in the control system 101. For example, when the respective services 160 in the MSA-based control system 101 perform a process of authenticating and approving the API call of the device in the outside 105, an authenticated source code should be able to written for each service. In this case, because code of each service is duplicated and authentication processing of the respective services 160 is separately managed, maintenance may fail to be smooth. Each service may fail to authenticate the API call, and the authentication service 120 may process authentication of the API call for all the services 160 in an integrated manner. When the device in the outside 105 requests authentication, the authentication service 120 may obtain an encrypted payload from a service corresponding to an authentication request target. The authentication service 120 may assign an identifier to the authentication request target. The authentication service 120 may store a pair of the identifier and the encrypted payload in storage (e.g., a key-value storage engine). For example, the storage may be a storage space different from the DB 140 of the control system 101. The authentication service 120 may generate an authentication token based on the identifier and may transmit the generated authentication token to the device in the outside 105. When the device in the outside 105 provides a data request, the authentication service 120 may verify the authentication token included in the data request. The authentication service 120 may recognize an identifier included in the authentication token and may obtain an encrypted payload corresponding to the identifier from the storage based on the identifier. The authentication service 120 may deliver the encrypted payload to the service corresponding to the identifier through the gateway service 110 and may receive an authentication result from the service.

The robot/user service 130 may include a service for the robot 191 and a user service. For example, the service for the robot 191 may provide data corresponding to the data request received from the robot 191. The user service may provide data corresponding to the data request received from the user device 193.

The DB 140 may store data transmitted and received with the outside 105 by the control system 101 and pieces of data used for an operation of the control system 101. For example, FIG. 1 illustrates the DB 140 as one component, but each of the services 160 included in the control system 101 may include the DB 140.

The services 160 may include one or more services (e.g., a first service 161, a second service 162, a third service 163, a fourth service 164, a fifth service 165, and a sixth service 166). The services 160 may include other services included in the MSA-based control system 101 except for the service for the robot 191 and the user service. The number of the services included in the services 160 is not limited to FIG. 1

A Kubernetes method may be used to transmit and receive data between the device in the outside 105 of the control system 101 and the services 160 (e.g., the gateway service 110) of the control system 101. For example, Kubernetes is a method for automatically generating, deleting, and managing a data analysis container generated when running an application, which may be a platform for automatizing a plurality of manual processes involved when deploying, managing, and expanding the containerized application.

Figure 2:
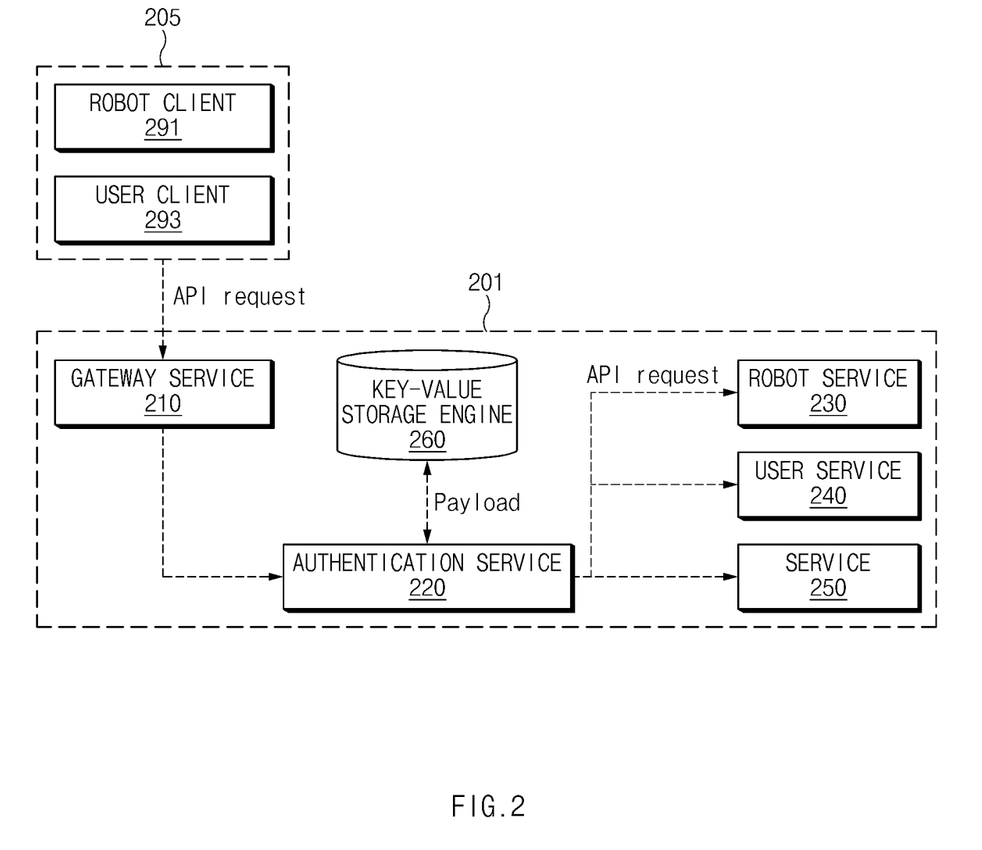
FIG. 2 is a block diagram illustrating an MSA-based control system.

FIG. 2 is a block diagram illustrating an MSA-based control system.

A control system 201 may include a gateway service 210, an authentication service 220, a robot service 230, a user service 240, a service 250, and a key-value storage engine 260. For example, the service 250 may include at least one other service included in the control system 201 except for the robot service 230 and the user service 240.

A client 205 (e.g., a robot client 291 or a user client 293) may transmit an API request to the control system 201. The API request may include a request for a function and/or data of a service (e.g., the robot service 230 or the user service 240) corresponding to the client 205. For example, the API request may include a login request, an authentication request, or a data request for a service. For example, the robot client 291 may include an autonomous ground vehicle (e.g., an autonomous mobile robot) associated with the control system 201. The user client 293 may include a terminal for the client 205, a manager device, and/or an application associated with the control system 201 and/or a robot.

The gateway service 210 may deliver the received API request to the authentication service 220. For example, the gateway service 210 may deliver a service corresponding to the API request (or a service corresponding to the client 205 which transmits the API request).

The authentication service 220 may perform an authentication processing operation based on the API request. The authentication service 220 may receive an encrypted payload (e.g., encrypted property information generated by each service) from the service corresponding to the API request (or the service corresponding to the client 205 which transmits the API request) based on the API request. For example, the authentication service 220 may request the encrypted payload from the robot service 230 based on the API request transmitted by the robot client 291. The authentication service 220 may request the encrypted payload from the user service 240 based on the API request transmitted by the user client 293. The authentication service 220 may assign an identifier to the client 205 which transmits the API request. For example, the identifier may include a universal unique identifier (UUID). The authentication service 220 may store a pair of the identifier and the encrypted payload in the key-value storage engine 260 (e.g., data storage). For example, the authentication service 220 may set the identifier to a key, may set the encrypted payload to a value, and may store a key-value in the key-value storage engine 260. The authentication service 220 may generate an authentication token based on the identifier. For example, the authentication token may include a JSON web token (JWT). For example, the JWT refers to a claim-based web token which stores properties for a user using a JSON format. For example, the JWT may be used to deliver information in a self-contained manner which uses the token itself as information. The authentication service 220 may not store information (e.g., an encrypted payload obtained from a service) in the JWT itself and may include only an identifier corresponding to the service in the JWT itself. For example, the authentication service 220 may include an identifier in a payload of the authentication token. For example, the authentication service 220 may fail to include data associated with the encrypted payload in the authentication token. For example, when the authentication token includes the data associated with the encrypted payload, the authentication token may be vulnerable to security as the authentication token is transmitted to the client 205. When the payload value of the authentication token includes only an identifier (e.g., a UUID) rather than specific data, it may be impossible to manipulate information even when a signature key of the authentication token is leaked in the outside (e.g., the client 205). For example, the capacity of the authentication token may be more reduced when only the identifier is included in the payload of the authentication token than when the specific data is included in the payload of the authentication token. As the capacity of the authentication token is reduced, a network load may be reduced when the authentication token is transmitted and received.

The authentication service 220 may transmit the generated authentication token to the client 205 through the gateway service 210.

The authentication service 220 may verify an authentication token included in a data request of the client 205 based on the data request. For example, the authentication service 220 may recognize the identifier included in the authentication token and may fetch an encrypted payload corresponding to the recognized identifier from the key-value storage engine 260. For example, the authentication service 220 may deliver the encrypted payload to a corresponding service and may receive an authentication result from the service. For example, the authentication service 220 may obtain data from the service or may obtain information indicating authentication failure. The authentication service 220 may transmit the authentication result to the client 205. The authentication result may be delivered to the client 205 through the gateway service 210 without passing through the authentication service 220.

The key-value storage engine 260 may be implemented as a component independent of a DB of the control system 201. For example, when each service stores the encrypted payload in a DB associated with each service or all DBs of the control system 201, a time taken to perform input and output processing of the database or each service may become relatively long. As a pair of the identifier and the encrypted payload is stored in the key-value storage engine 260, because the respective services are able to fetch the payload based on the identifier, a time taken to perform input and output processing may be reduced.

The authentication service 220 may deliver an API request to each service. For example, when each service separately performs authentication and when a problem associated with the authentication token or the authentication occurs, there is a need to correct and manage the authentication problem for each service. As the authentication service 220 unifies and processes authentication procedures for the services included in the control system 201, only the authentication service 220 may be corrected and/or managed when a problem associated with the authentication token or the authentication occurs or when correction is required, and it is possible to efficiently manage the authentication procedures in terms of maintenance.

Hereinafter, a description will be given in detail of an authentication processing operation with reference to FIG. 3.

Figure 3:
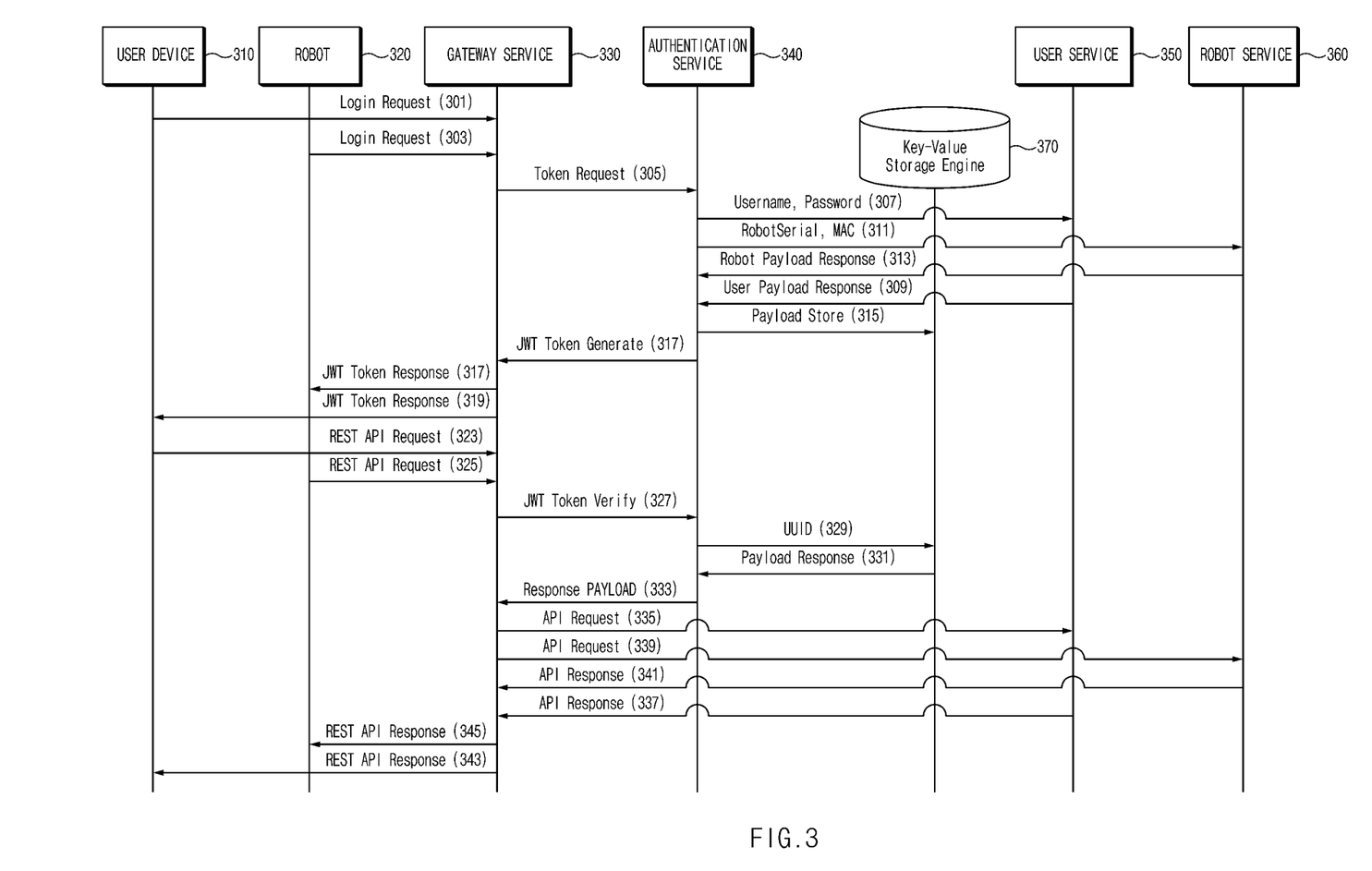
FIG. 3 is a drawing illustrating an operation of processing authentication in an MSA-based control system.

FIG. 3 is a drawing illustrating an operation of processing authentication in an MSA-based control system.

The control system may include a user device 310 or a robot 320, a gateway service 330, an authentication service 340, a user service 350, a robot service 360, and a key-value storage engine 370. Hereinafter, operations (e.g., operations 301 and 303, operations 307 and 311, operations 309 and 313, operations 319 and 321, operations 323 and 325, operations 335 and 339, operations 337 and 341, and operations 343 and 345) associated with the user device 310 and the robot 320 may be performed independently of each other.

In operation 301, the user device 310 may transmit a login request for a specific service (e.g., the user service 350) included in the control system (e.g., the gateway service 330) to the control system. For example, the login request may include a user name (or a user ID) and a password.

In operation 303, the robot 320 may transmit a login request for a specific service (e.g., the robot service 360) included in the control system (e.g., the gateway service 330) to the control system. For example, the login request may include identification information (e.g., a serial number) of the robot 320 and address information (e.g., a MAC address).

In operation 305, the gateway service 330 may request an authentication token from the authentication service 340. For example, the authentication token may include a JWT.

In operation 307, the authentication service 340 may request a payload while transmitting the user name and the password to the user service 350.

In operation 309, the user service 350 may transmit a user payload response to the authentication service 340. For example, the user service 350 may generate a payload based on the user name and the password and may encrypt the generated payload. The user service 350 may transmit the encrypted payload to the authentication service 340.

In operation 311, the authentication service 340 may request a payload while transmitting the identification information of the robot 320 and the address information to the robot service 360.

In operation 313, the robot service 360 may transmit a payload response for the robot 320 to the authentication service 340. For example, the robot service 360 may generate a payload based on the identification information of the robot 320 and the address information and may encrypt the generated payload. The robot service 360 may transmit the encrypted payload to the authentication service 340.

In operation 315, the authentication service 340 may store the payload included in the received user payload response or the received payload response for the robot 320 in the key-value storage engine 370. For example, the authentication service 340 may assign an identifier (e.g., a UUID) for each service. The authentication service 340 may set the identifier to a key value and may set the payload to a value to generate key-value pair information. The authentication service 340 may store the key-value pair information in the key-value storage engine 370.

In operation 317, the authentication service 340 may generate an authentication token (e.g., a JWT) based on the identifier and may transmit the generated authentication token to the gateway service 330. For example, the authentication token may include only information about the identifier without information about the payload received from the service.

In operation 319, the gateway service 330 may transmit an authentication token response to the user device 310. For example, the authentication token response may include the authentication token generated in operation 317.

In operation 321, the gateway service 330 may transmit the authentication token response to the robot 320.

In operation 323, the user device 310 may transmit a representational state transfer application programming interface (REST API) request for the user service 350 to the control system (e.g., the gateway service 330). For example, the REST API request may include a data request for the user service 350. For example, the REST API request may include an authentication token for the user service 350.

In operation 325, the robot 320 may transmit the REST API request for the robot service 360 to the control system (e.g., the gateway service 330). For example, the REST API request may include a data request for the robot service 360. For example, the REST API request may include an authentication token for the robot service 360.

In operation 327, the gateway service 330 may request the authentication service 340 to verify the authentication token in response to the REST API request. For example, the authentication service 340 may verify a signature of the authentication token and may recognize an identifier (e.g., a UUID) included in the authentication token.

In operation 329, the authentication service 340 may provide the key-value storage engine 370 with the identifier (e.g., the UUID). For example, the authentication service 340 may search for key-value pair information corresponding to the identifier based on the identifier.

In operation 331, the authentication service 340 may obtain a payload response from the key-value storage engine 370. For example, the authentication service 340 may obtain a payload corresponding to the identifier from the key-value pair information corresponding to the identifier, which is stored in the key-value storage engine 370.

In operation 333, the authentication service 340 may deliver the payload response to the gateway service 330. For example, the authentication service 340 may transmit the obtained payload to the gateway service 330.

In operation 335, the gateway service 330 may transmit an API request to the user service 350. For example, the gateway service 330 may generate an API request for the user service 350 based on the payload and may transmit the generated API request to the user service 350. For example, the API request may include an encrypted payload.

In operation 337, the user service 350 may transmit an API response the gateway service 330. For example, the user service 350 may decrypt the encrypted payload and may identify a data access right of the user device 310. For example, when the data access right of the user device 310 is allowed (i.e., when the authentication of the user device 310 succeeds), the user service 350 may transmit data requested by the user device 310 to the gateway service 330. For example, when the data access right of the user device 310 is not allowed (i.e., when the authentication of the user device 310 fails), the user service 350 may transmit information indicating authentication failure to the gateway service 330.

In operation 339, the gateway service 330 may transmit an API request to the robot service 360. For example, the gateway service 330 may generate an API request for the robot service 360 based on the payload and may transmit the generated API request to the robot service 360.

In operation 341, the gateway service 330 may transmit an API response from the robot service 360. For example, the robot service 360 may decrypt the encrypted payload and may identify a data access right of the robot 320. For example, when the data access right of the robot 320 is allowed (i.e., when the authentication of the robot 320 succeeds), the robot service 360 may transmit data requested by the robot 320 to the gateway service 330. For example, when the data access right of the robot 320 is not allowed (i.e., when the authentication of the robot 320 fails), the robot service 360 may transmit information indicating authentication failure to the gateway service 330.

In operation 343, the gateway service 330 may transmit a REST API response to the user device 310. For example, the REST API response may include data requested by the user device 310 or information indicating that the authentication of the user device 310 fails.

In operation 345, the gateway service 330 may transmit a REST API response to the robot 320. For example, the REST API response may include data requested by the robot 320 or information indicating that the authentication of the robot 320 fails.

In the control system clients (e.g., the user device 310 and the robot 320) and services (e.g., the user service 350 and the robot service 360) corresponding to the clients may fail to independently perform authentication through a REST API call/response and an API call/response and the authentication service 340 may unify and process authentication procedures for the respective clients and the respective services.

Figure 4:
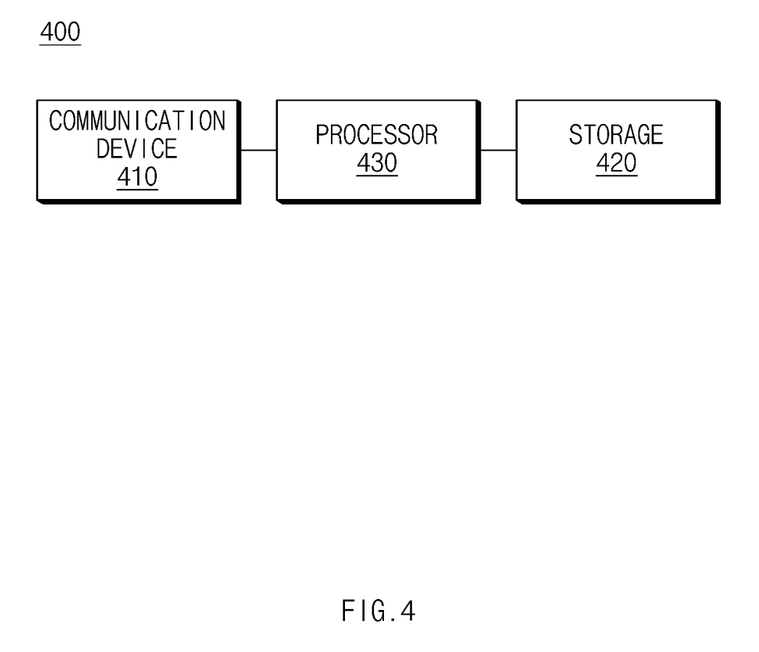
FIG. 4 is a block diagram of an MSA-based authentication device.

FIG. 4 is a block diagram of an MSA-based authentication device. For example, an authentication device 400 may include an authentication service included in an MSA-based control system.

The authentication device 400 (e.g., an authentication service 120 of FIG. 1 or an authentication service 220 of FIG. 2) may include a communication device 410, a processor 430, and storage 420.

The communication device 410 may allow the authentication device 400 to transmit and receive data with an external device (e.g., an external client device and/or another service included in the control system).

The communication device 410 may include a communication circuit for transmitting and receiving data with the external device. For example, the communication device 410 may include at least one of a mobile communication module, a wireless Internet module, or a short-range communication module. The mobile communication module may communicate with an external autonomous ground vehicle, an external control server, and/or an external manager device over a mobile communication network established according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

The wireless Internet module may be a module for wireless Internet access, which may communicate with the external device through wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or like.

The storage 420 may store data associated with an authentication processing operation of the authentication device 400. For example, the storage 420 may store a pair of an identifier and a payload (e.g., a key-value).

The storage 420 may include a key-value storage engine of FIG. 2. The storage 420 (e.g., the key-value storage engine) may be storage included in the authentication device 400 and may be storage outside the authentication device 400.

The storage 420 may store instructions executed by the processor 430. The storage 420 may include at least one of at least one of storage media such as a flash memory, a hard disk, a solid state disk (SSD), a secure digital (SD) card, an embedded multimedia card (eMMC), universal flash storage (UFS), a removable disk, and/or web storage or storage media such as a random access memory (RAM), a static RAM (SRAM), a read only memory (ROM), a programmable ROM (PROM), an electrically erasable and programmable ROM (EEPROM), and/or an erasable and programmable ROM (EPROM).

The processor 430 may receive an authentication request from a client device through the communication device 410. For example, the authentication request may include information associated with the client device and/or a specific service. For example, an authentication request of a user client device may include an ID and a password of a user for accessing a specific service. An authentication request of a robot client device may include an identification number of a robot and an address (e.g., a MAC address) associated with a specific service. For example, the authentication request may include an API call of the client device. For example, when the client device makes an API call to a corresponding service included in the MSA-based control system, the processor 430 may start an authentication procedure of the client device based on the API call.

The processor 430 may recognize an authentication request target. For example, the processor 430 may determine whether a target requested for authentication by the client device is any of services included in the control system. For example, the authentication request target may be a service corresponding to a client which transmits an authentication request.

The processor 430 may request an encrypted payload from a service corresponding to the authentication request target through the communication device 410. For example, the encrypted payload may include a value obtained as the service encrypts information used for client authentication. For example, each of the services included in the control system may encrypt information used for authentication in a specified manner for each service. For example, the payload may include an issuer associated with an authentication token, a subject associated with the authentication token, an audience associated with the authentication token, an expiration associated with the authentication token, an active date authentication with the authentication token, an issue time associated with the authentication token, a token identifier associated with the authentication token, information for public use defined between the client device and the service, and/or information randomly specified between the client device and the service.

The processor 430 may determine an identifier corresponding to the service. For example, the processor 430 may determine a different identifier for each service. For example, the identifier may include a universal unique identifier (UUID).

The processor 430 may store a pair of the identifier and the encrypted payload. For example, the processor 430 may set the identifier to a key, may set the encrypted payload to a value, and may generate key-value pair information which corresponds to each other. For example, the processor 430 may store the key-value pair information in storage (e.g., a key-value storage engine). The storage may be included in the authentication device 400 (e.g., the storage 420 of the authentication device 400) and may be implemented as a storage space independent of the authentication device 400 in the control system.

The processor 430 may generate an authentication token based on the identifier and may transmit the authentication token to the client device through the communication device 410. For example, the authentication token may include information about the identifier. For example, the authentication token may fail to include data corresponding to the encrypted payload. For example, the authentication token may include a JSON web token (JWT). For example, the JWT may include a header, a payload, and a signature. The processor 430 may include information about the identifier (e.g., the UUID) in the payload of the JWT and may fail to include data associated with the encrypted payload received from the service. For example, the processor 430 may directly transmit the generated authentication token to the client device or may transmit the generated authentication token to the client device through a gateway device (or a gateway service) of the control system.

The processor 430 may receive a data request including the authentication token from the client device through the communication device 410. For example, the authentication request may include an API call (e.g., a REST API request) of the client device.

The processor 430 may recognize an identifier corresponding to the authentication token. For example, the processor 430 may verify a signature of the authentication token included in the data request. For example, the processor 430 may verify the signature of the authentication token using a specified signature key (or secret key). The processor 430 may recognize an identifier (e.g., a UUID) corresponding to the authentication token as a result of the verification.

The processor 430 may obtain an encrypted payload corresponding to the identifier. For example, the processor 430 may identify a key-value pair which has the identifier as a key value among pieces of key-value pair information stored in the storage. For example, the processor 430 may obtain an encrypted payload from a value of the identified key-value pair. For example, the processor 430 may transmit the encrypted payload to a service corresponding to the identifier.

The processor 430 may identify a data access right based on the encrypted payload. For example, the processor 430 may obtain information indicating whether to allow data access based on the encrypted payload from the service corresponding to the identifier. For example, the service corresponding the identifier may decrypt the encrypted payload and may identify an access right of the client device. The processor 430 may receive the result of identifying the data access right from the service. For example, the processor 430 may transmit and receive the encrypted payload and the information indicating whether to allow the data access with the service corresponding to the identifier through the gateway device included in the MSA-based control system.

The processor 430 may transmit data or information indicating authentication failure to the client device based on the access right. For example, the processor 430 may transmit data requested by the client device to the client device when the access right is allowed and may transmit information indicating authentication failure (or that there is no data access right) to the client device when the access right is not allowed. the processor 430 may transmit the data or the information indicating the authentication failure to the client device through the gateway device. The data or the information indicating the authentication failure may be transmitted from the service to the client device without passing through the authentication device 400.

Hereinafter, a description will be given in detail of an authentication processing method with reference to FIGS. 5 to 8. FIGS. 5 to 8 are flowcharts for describing an authentication processing method.

Hereinafter, it is assumed that a control system 101 of FIG. 1 (e.g., an authentication service 130), a control system 201 of FIG. 2 (e.g., an authentication service 220), a control system of FIG. 3 (e.g., an authentication service 340), or an authentication device 400 of FIG. 4 performs a process of FIGS. 5 to 8. Furthermore, in a description of FIGS. 5 to 8, an operation described as being performed by an authentication device may be understood as being controlled by a processor 430 of the authentication device.

Figure 5:
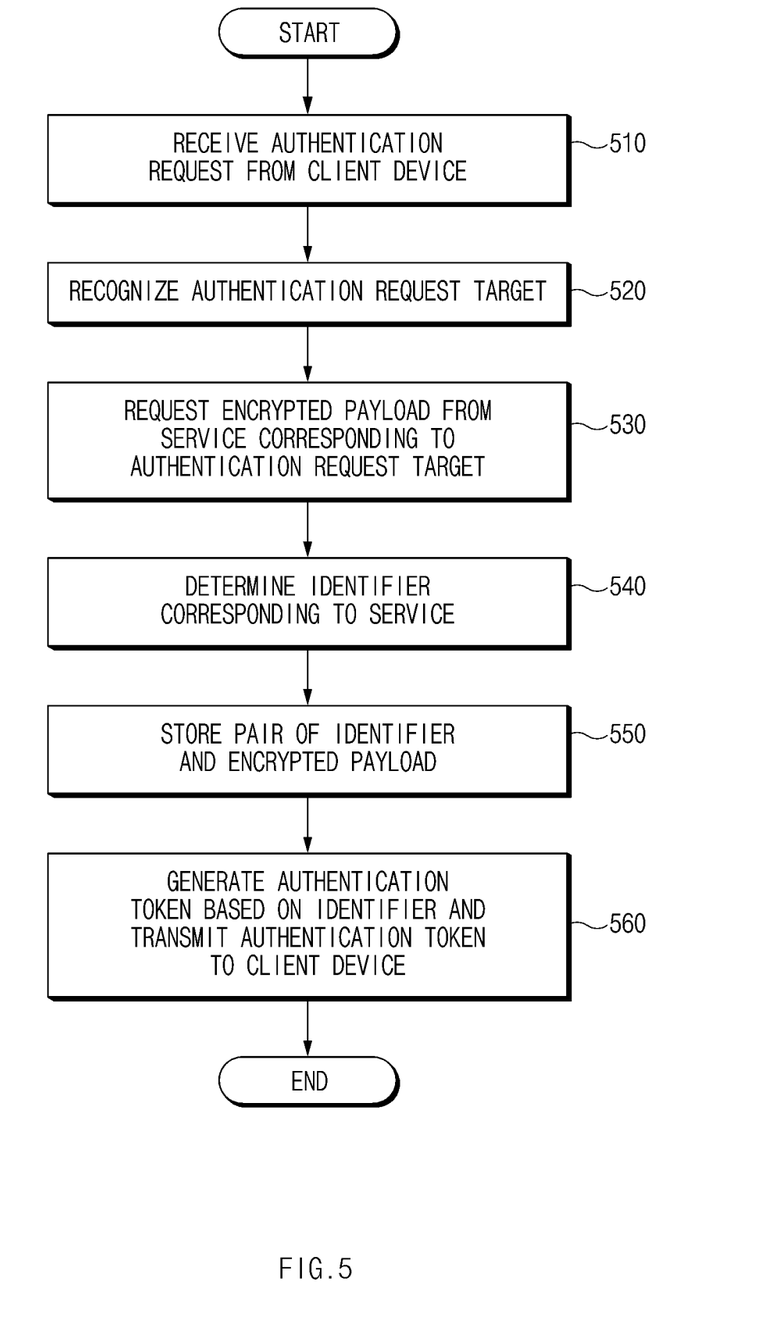
FIG. 5 is a flowchart of an authentication processing method of an authentication device.

FIG. 5 is a flowchart of an authentication processing method of an authentication device.

In operation 510, the authentication device may receive an authentication request from a client device. For example, the authentication request may include information associated with the client device and/or a specific service. For example, an authentication request of a user client device may include an ID and a password of a user for accessing a specific service. An authentication request of a robot client device may include an identification number of a robot and an address (e.g., a MAC address) associated with a specific service. For example, the authentication request may include an API call of the client device. For example, when the client device makes an API call to a corresponding service included in an MSA-based control system, the authentication device may start an authentication procedure of the client device based on the API call.

In operation 520, the authentication device may recognize (e.g., determine) an authentication request target, for example, based on the authentication request). For example, the authentication device may determine whether a target requested for authentication by the client device is any of services included in the control system. For example, the authentication request target may be a service corresponding to a client which transmits an authentication request.

In operation 530, the authentication device may request an encrypted payload from a service corresponding to the authentication request target. For example, the encrypted payload may include a value obtained as the service encrypts information used for client authentication. For example, each of the services included in the control system may encrypt information used for authentication in a specified manner for each service. For example, the payload may include an issuer associated with an authentication token, a subject associated with the authentication token, an audience associated with the authentication token, an expiration associated with the authentication token, an active date associated with the authentication token, an issue time associated with the authentication token, a token identifier associated with the authentication token, information for public use defined between the client device and the service, and/or information randomly specified between the client device and the service.

In operation 540, the authentication device may determine an identifier corresponding to the service. For example, the authentication device may determine a different identifier for each service. For example, the identifier may include a universal unique identifier (UUID).

In operation 550, the authentication device may store a pair of the identifier and the encrypted payload. For example, the authentication device may set the identifier to a key, may set the encrypted payload to a value, and may generate key-value pair information which corresponds to each other. For example, the authentication device may store the key-value pair information in storage (e.g., a key-value storage engine). The storage may be included in the authentication device (e.g., storage of the authentication device) and may be implemented as a storage space independent of the authentication device.

In operation 560, the authentication device may generate an authentication token based on the identifier and may transmit the authentication token to the client device. For example, the authentication token may include information about the identifier. For example, the authentication token may fail to include data corresponding to the encrypted payload. For example, the authentication token may include a JSON web token (JWT). For example, the JWT may include a header, a payload, and a signature. The authentication device may include information about the identifier (e.g., the UUID) in the payload of the JWT and may fail to include data associated with the encrypted payload received from the service. For example, the authentication device may directly transmit the generated authentication token to the client device or may transmit the generated authentication token to the client device through (e.g., via) a gateway device (or a gateway service) of the control system.

Figure 6:
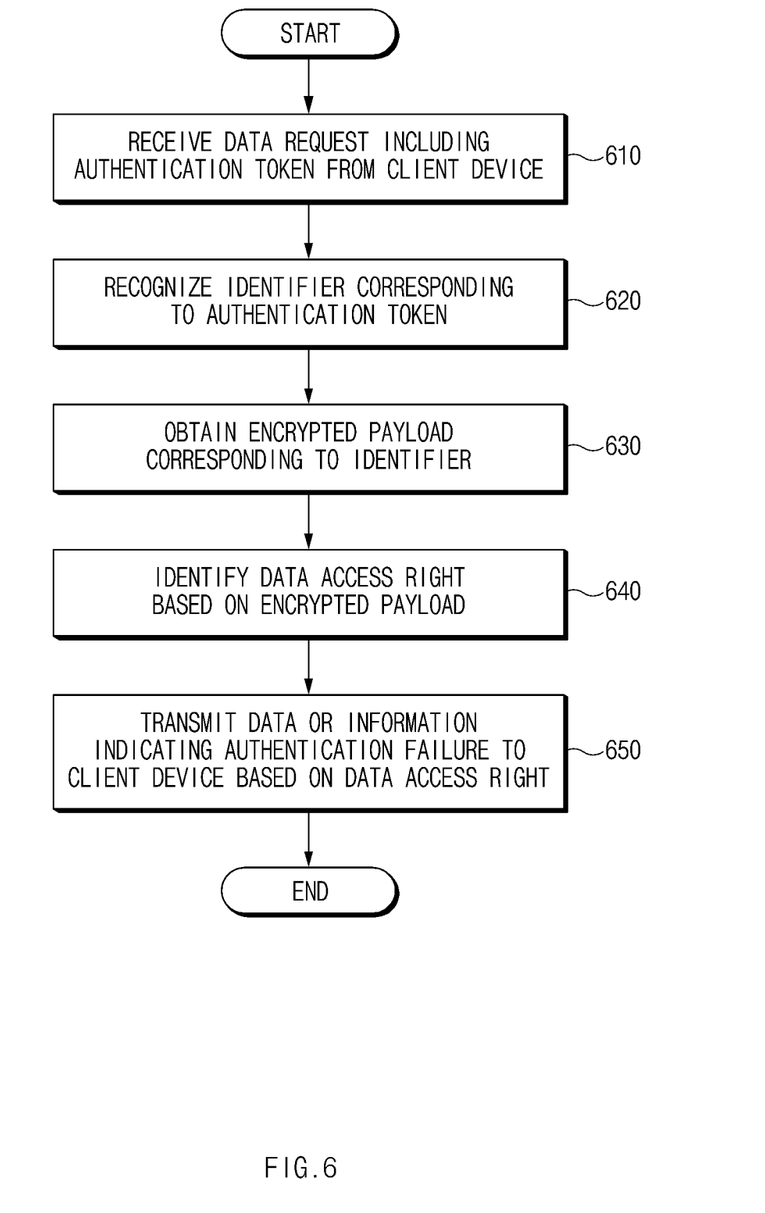
FIG. 6 is a flowchart of an authentication processing method of an authentication device.

FIG. 6 is a flowchart of an authentication processing method of an authentication device.

In operation 610, the authentication device may receive a data request including an authentication token from a client device. For example, the authentication request may include an API call (e.g., a REST API request) of the client device.

In operation 620, the authentication device may recognize an identifier corresponding to the authentication token. For example, the authentication device may verify a signature of the authentication token included in the data request. For example, the authentication device may verify the signature of the authentication token using a specified signature key (or secret key). The authentication device may recognize an identifier (e.g., a UUID) corresponding to the authentication token as a result of the verification.

In operation 630, the authentication device may obtain an encrypted payload corresponding to the identifier. For example, the authentication device may identify a key-value pair which has the identifier as a key value among pieces of key-value pair information stored in storage. For example, the authentication device may obtain an encrypted payload from a value of the identified key-value pair.

For example, the authentication device may transmit the encrypted payload to a service corresponding to the identifier.

In operation 640, the authentication device may identify a data access right based on the encrypted payload. For example, the authentication device may obtain information indicating whether to allow data access based on the encrypted payload from the service corresponding to the identifier. For example, the service corresponding the identifier may decrypt the encrypted payload and may identify an access right of the client device. The authentication device may receive the result of identifying the data access right from the service. For example, the authentication device may transmit and receive the encrypted payload and the information indicating whether to allow the data access with the service corresponding to the identifier through a gateway device included in an MSA-based control system.

In operation 650, the authentication device may transmit data or information indicating authentication failure to the client device based on the access right. For example, the authentication device may transmit data requested by the client device to the client device when the access right is allowed and may transmit information indicating authentication failure (or that there is no data access right) to the client device when the access right is not allowed. The authentication device may transmit the data or the information indicating the authentication failure to the client device through the gateway device. The data or the information indicating the authentication failure may be transmitted from the service to the client device without passing through the authentication device.

Figure 7:
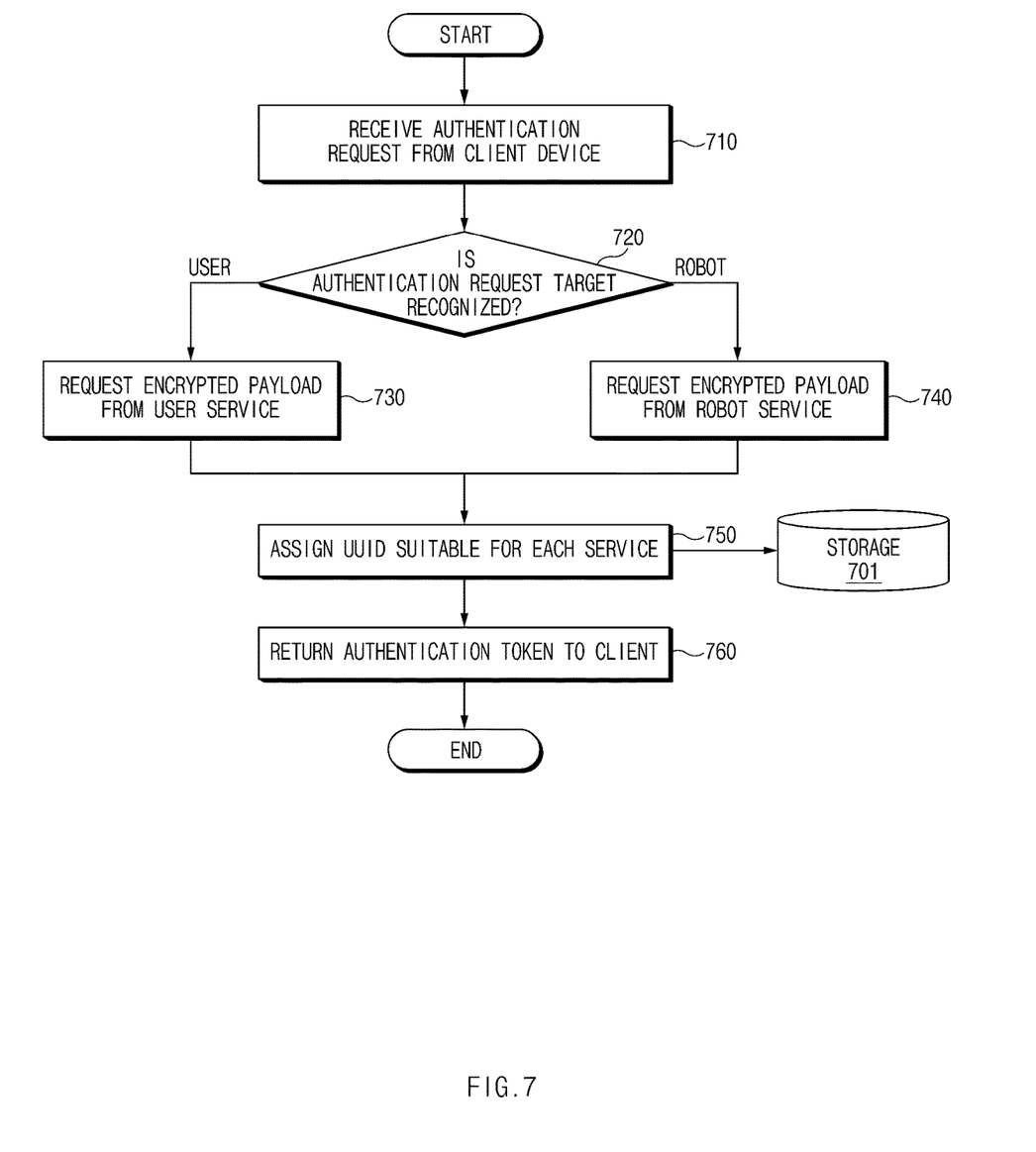
FIG. 7 is a flowchart of an authentication processing method of an authentication device.

FIG. 7 is a flowchart of an authentication processing method of an authentication device. For example, FIG. 7 illustrates authentication operations when a client requests authentication.

In operation 710, the authentication device may receive an authentication request from the client. For example, the authentication request may include information associated with the client and/or a specific service. For example, an authentication request of a user client may include an ID and a password of a user for accessing a specific service. An authentication request of a robot client may include an identification number of a robot and an address (e.g., a MAC address) associated with a specific service.

In operation 720, the authentication device may recognize an authentication request target. For example, the authentication device may determine whether the authentication request target is a user service or a robot service. For example, the authentication request target may correspond to a client which transmits an authentication request. For example, the authentication request target may be the user service when the client is the user client, and the authentication request target may be the robot service when the client is the robot client. The authentication device may perform operation 730 when the authentication request target is the user service and may perform operation 740 when the authentication request target is the robot service.

In operation 730, the authentication device may request an encrypted payload from a user service. For example, the authentication device may receive the encrypted payload from the user service.

In operation 740, the authentication device may request an encrypted payload robot from a robot service. For example, the authentication device may receive the encrypted payload from the robot service. The user service and the robot service may encrypt the payload in respective manners.

In operation 750, the authentication device may assign a UUID suitable for each service. For example, the authentication device may determine a UUID corresponding to the user service or the robot service. The authentication device may store a pair of the UUID and the encrypted payload in storage 701. For example, the authentication device may set the UUID to a key, may set the encrypted payload to a value, and may generate a key-value pair which corresponds to each other. The authentication device may store the key-value pair in the storage 701.

In operation 760, the authentication device may generate an authentication token (e.g., a JSON web token (JWT)) and may return the authentication token to the client. For example, the authentication device may include a UUID in the authentication token (e.g., a payload of the authentication token). For example, the authentication token may fail to include data associated with the encrypted payload in the authentication token. For example, the authentication token may include only the UUID without including the encrypted payload. For example, the JWT may include a header, a payload, and a signature. The authentication device may include the UUID in the payload of the JWT. The authentication device may fail to include another data except for the UUID in the payload of the JWT. The authentication device may transmit the generated authentication token to the client device.

Figure 8:
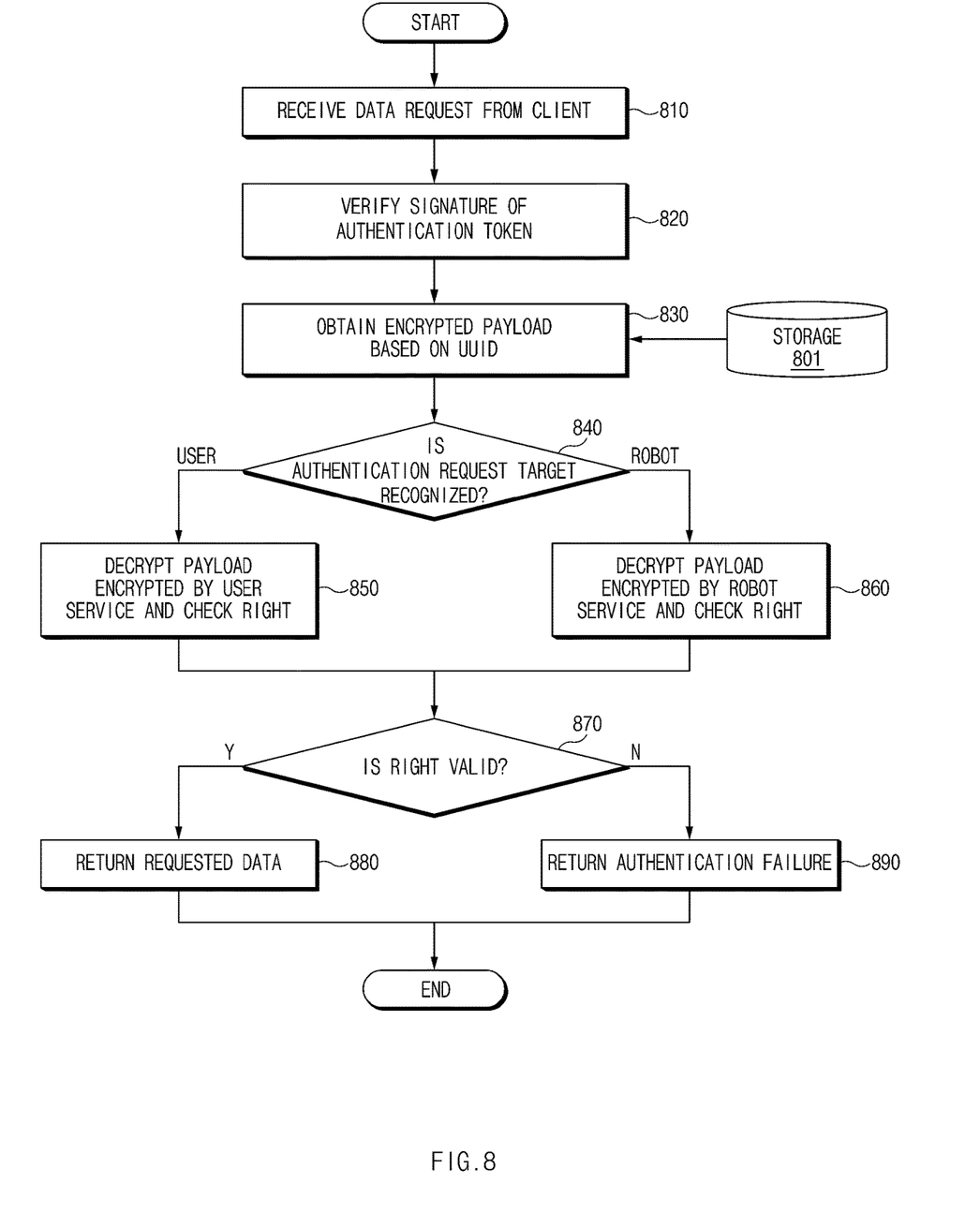
FIG. 8 is a flowchart of an authentication processing method of an authentication device.

FIG. 8 is a flowchart of an authentication processing method of an authentication device. For example, FIG. 8 illustrates authentication operations when a client requests data. For example, FIG. 8 may be performed after operations of FIG. 7.

In operation 810, the authentication device may receive a data request from the client. For example, the data request may include an authentication token (e.g., an authentication token returned in operation 760 of FIG. 7).

In operation 820, the authentication device may verify a signature of the authentication token. For example, the authentication token may include a header, a payload, and a signature. The authentication device may verify the signature of the authentication token using a specified signature key (or secret key). For example, the authentication device may recognize a UUID included in the authentication token.

In operation 830, the authentication device may obtain an encrypted payload based on the UUID. For example, the authentication device may obtain a payload corresponding to the UUID from storage 801. For example, the authentication device may search for a key-value which has the recognized UUID as a key value among key-value pairs stored in the storage 801 and may obtain a payload corresponding to the value.

In operation 840, the authentication device may recognize an authentication request target. For example, the authentication device may determine whether the authentication request target is a user service or a robot service. For example, the authentication request target may correspond to a client which transmits an authentication request. The authentication device may perform operation 850 when the authentication request target is the user service and may perform operation 860 when the authentication request target is the robot service.

In operation 850, the authentication device may decrypt the payload encrypted by the user service and may check a right. For example, the user service may check a data access right of a user client based on the decrypted payload.

In operation 860, the authentication device may decrypt the payload encrypted by the robot service and may check a right. For example, the robot service may check a data access right of a robot client based on the decrypted payload.

In operation 870, the authentication device may determine whether the right is valid. For example, the authentication device may perform operation 880 when the data access right is valid and may perform operation 890 when the data access right is not valid.

In operation 880, the authentication device may return data requested by the client to the client. For example, the authentication device may transmit the requested data to the client through a gateway service.

In operation 890, the authentication device may return authentication failure to the client. For example, the authentication device may transmit information indicating authentication failure (i.e., information indicating that there is no data access right) to the client. For example, the authentication device may transmit the information indicating the authentication failure to the client through the gateway service.

Figure 9:
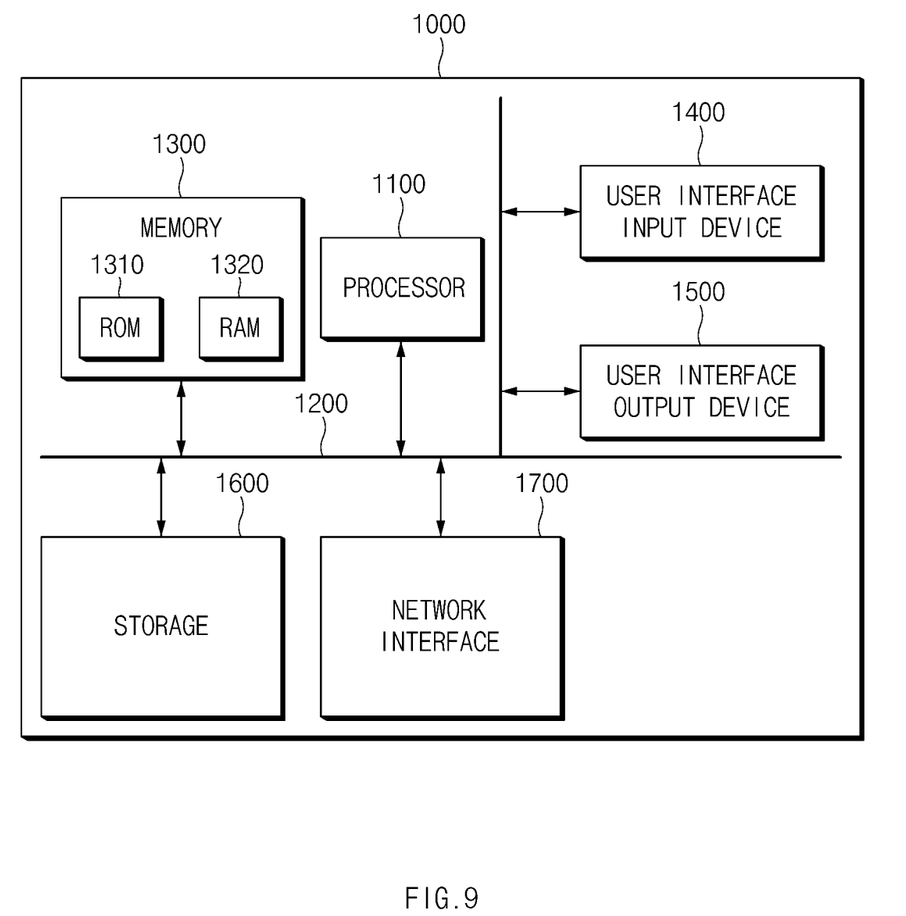
FIG. 9 is a block diagram illustrating a computing system.

FIG. 9 is a block diagram illustrating a computing system.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to one or more example embodiments of the present disclosure, the authentication device and the authentication processing method thereof may prevent a network load from increasing upon MSA-based robot control, may enhance security, and may facilitate maintenance of a microservice.

According to one or more example embodiments of the present disclosure, the authentication device and the authentication processing method thereof may process authentication processes for a user or a robot in MSA-based microservices in an integrated manner.

In addition, various effects ascertained directly or indirectly through the present disclosure may be provided.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the one or more example embodiments of the present disclosure are provided to explain the spirit and scope of the present disclosure, but not to limit them, so that the spirit and scope of the present disclosure is not limited by the example embodiment(s). The scope of the present disclosure should be construed on the basis of the accompanying claims, and all the technical ideas within the scope equivalent to the claims should be included in the scope of the present disclosure.

What is claimed is:

1. An authentication device comprising:
a communication device;
data storage;
one or more processors; and
memory storing instructions that, when executed by the one or more processors, cause the one or more processors to:
receive, via the communication device, an authentication request from a client device;
determine, based on the authentication request, whether an authentication request target is a user service or a robot service among a plurality of services of a microservice architecture (MSA);
request, via the communication device, an encrypted payload from a first service corresponding to the authentication request target, wherein the user service and the robot service are configured to encrypt the requested payload in respective manners;
determine an identifier corresponding to the first service;
store, in the data storage, the identifier and the encrypted payload;
generate, based on at least one of the identifier or the encrypted payload, an authentication token; and
send the authentication token to the client device.

2. The authentication device of claim 1, wherein the authentication token comprises information associated with the identifier.

3. The authentication device of claim 1, wherein the authentication token does not include the encrypted payload.

4. The authentication device of claim 1, wherein the instructions, when executed by the one or more processors, further cause the one or more processors to:
determine a key corresponding to the identifier;
determine a value corresponding to the encrypted payload; and
generate a key-value pair comprising the key and the value, and
wherein the instructions, when executed by the one or more processors, cause the one or more processors to store the identifier and the encrypted payload by storing, in the data storage, the key-value pair.

5. The authentication device of claim 1, wherein the authentication token comprises a JavaScript Object Notation (JSON) web token (JWT), wherein a payload of the authentication token comprises information of the identifier, and wherein the plurality of services of MSA comprise:
a plurality of user services associated with first identifiers, respectively; and
a plurality of robot services associated with second identifiers, respectively.

6. The authentication device of claim 1, wherein the identifier comprises a universal unique identifier (UUID).

7. The authentication device of claim 1, wherein the instructions, when executed by the one or more processors, further cause the one or more processors to:
receive, from the client device, a data request comprising the authentication token;
determine the identifier corresponding to the authentication token included in the data request;
obtain the encrypted payload corresponding to the identifier;
determine, based on the encrypted payload corresponding to the identifier, a data access right; and
send an indication of authentication failure to the client device, wherein the authentication failure is based on the data access right.

8. The authentication device of claim 7, wherein the instructions, when executed by the one or more processors, cause the one or more processors to determine the data access right by:
sending, to the first service, the encrypted payload; and
obtaining, from the first service, information indicating, based on the encrypted payload, whether to allow data access.

9. The authentication device of claim 8, wherein the MSA comprises a gateway device, and
wherein the instructions, when executed by the one or more processors, configure the MSA of the authentication device to send the encrypted payload and obtain the information via the gateway device.

10. The authentication device of claim 7, wherein the instructions, when executed by the one or more processors, cause the one or more processors to determine the identifier corresponding to the authentication token by:
verifying a signature of the authentication token included in the data request, and
determining the identifier corresponding to the authentication token based on the verification.

11. A method comprising:
receiving, by a processor of a computing device that comprises a microservice architecture (MSA), an authentication request from a client device;
determining, by the processor and based on the authentication request, whether an authentication request target is a user service or a robot service;
requesting, by the processor, an encrypted payload from the user service or the robot service depending on the authentication request target, wherein the user service and the robot service are configured to respectively encrypt the requested payload in different manners, and wherein the encrypted payload corresponding to a first service;
determining, by the processor, an identifier corresponding to the first service;
storing, by the processor, in data storage of the computing device, the identifier and the encrypted payload; and
generating, by the processor and based on at least one of the identifier or the encrypted payload, an authentication token; and
sending, by the processor via a communication device of the computing device, the authentication token to the client device.

12. The method of claim 11, wherein the authentication token comprises information associated with the identifier, and wherein a plurality of services of MSA comprises the user service and the robot service.

13. The method of claim 11, wherein the authentication token does not include the encrypted payload.

14. The method of claim 11, wherein the storing comprises:
determining a key corresponding to the identifier;
determining a value corresponding to the encrypted payload;
generating a key-value pair comprising the key and the value; and
storing the key-value pair.

15. The method of claim 11, wherein the authentication token comprises a JavaScript Object Notation (JSON) web token (JWT), wherein a payload of the authentication token comprises information of the identifier, and wherein a plurality of services of MSA comprise:
a plurality of user services associated with first identifiers, respectively; and
a plurality of robot services associated with second identifiers, respectively.

16. The method of claim 11, wherein the identifier comprises a universal unique identifier (UUID).

17. The method of claim 11, further comprising:
receiving, from the client device, a data request comprising the authentication token;
determining the identifier corresponding to the authentication token included in the data request;
obtaining the encrypted payload corresponding to the identifier;
determining, based on the encrypted payload corresponding to the identifier, a data access right; and
sending an indication of authentication failure to the client device, wherein the authentication failure is based on the data access right.

18. The method of claim 17, wherein the determining of the data access right comprises:
sending, to the first service, the encrypted payload; and
obtaining, from the first service, information indicating, based on the encrypted payload, whether to allow data access.

19. The method of claim 18, wherein the MSA comprises a gateway device,
wherein the sending of the encrypted payload comprises sending the encrypted payload via the gateway device, and
wherein the obtaining of the information comprises obtaining the information via the gateway device.

20. The method of claim 17, wherein the determining of the identifier corresponding to the authentication token comprises:
verifying a signature of the authentication token included in the data request; and
determining the identifier corresponding to the authentication token based on the verification.

* * * * *